United States Patent [19]
Tonelli et al.

[11] Patent Number: 5,204,001
[45] Date of Patent: Apr. 20, 1993

[54] MEMBRANE BIOREACTOR SYSTEM FOR TREATING SYNTHETIC METAL-WORKING FLUIDS AND OIL-BASED PRODUCTS

[75] Inventors: Fernando A. Tonelli, Dundas; R. Philip Canning, Waterdown, both of Canada

[73] Assignee: Zenon Environmental Inc., Burlington, Canada

[21] Appl. No.: 773,226

[22] Filed: Oct. 9, 1991

[51] Int. Cl.$^5$ .............................................. C02F 3/12
[52] U.S. Cl. ................................... 210/608; 210/622; 210/626; 210/151; 210/195.2; 210/195.3
[58] Field of Search ........ 210/608, 616, 617, 621-623, 210/626, 631, 151, 150, 195.2, 195.3, 195.1

[56] References Cited

U.S. PATENT DOCUMENTS

| | | | |
|---|---|---|---|
| 3,472,765 | 10/1969 | Budd et al. | 210/195.2 |
| 4,655,928 | 4/1987 | Milton et al. | 210/195.2 |
| 4,749,494 | 6/1988 | Tomoyasu et al. | 210/626 |
| 4,787,978 | 11/1988 | Nicol | 210/622 |
| 4,883,594 | 11/1989 | Sekoulov et al. | 210/622 |
| 4,904,387 | 2/1990 | Jordan | 210/622 |

Primary Examiner—Thomas Wyse
Attorney, Agent, or Firm—Alfred D. Lobo

[57] ABSTRACT

A system to treat wastewater from a metal-working facility, such as an automotive manufacturing plant in a bioreactor using live microorganisms. Such wastewater contains waste fluids which are a mixture of relatively easily biodegradable fats and oils, much less easily biodegradable synthetic fluids, oils and greases, and non-biodegradable material including inorganic finely divided solids such as metal and silicon carbide particles. Such waste fluids require a hydraulic retention time (HRT) and a solids retention time (SRT) which is 10 times greater than for sewage. High quality water is separated from suspended solids which are removed from the reactor at an essentially constant rate and fed to an ultrafiltration membrane. Concentrate is recycled to the reactor, except for a bleed stream to remove solids periodically. The membranes acquire a long and effective life despite large variations in membrane flux, because of a permeate recycle which permits operation of the bioreactor at constant volume; permits flow of feed wastewater to the reactor at constant flow rate; and allows operation of the membrane modules at a relatively low pressure in a narrow range which does not damage the membranes. Such operation of the bioreactor allows one to use a reactor which is one-half the size (volume) than one which would be required with a system without a permeate recycle. Effective and long-lived operation of the membranes is obtained by filtering out (through a 140 mesh screen) all solids greater in diameter than about 106 μm. Pilot plant tests conducted with wastewater from automobile manufacturing plants over a period of more than a year provide evidence of the surprising effectiveness of the system over a prolonged period.

15 Claims, 3 Drawing Sheets

MEMBRANE BIOREACTOR SYSTEM FOR TREATING SYNTHETIC METAL-WORKING FLUIDS AND OIL-BASED PRODUCTS

BACKGROUND OF THE INVENTION

Operation of an aerobic bioreactor is highly sensitive to the composition of wastewater treated and the time within which treatment is to be completed. Stated differently, given enough time and no reasonable constraint on the expenditure of energy, the challenge to operate a waste treatment system would be de minimis. Since the challenge is to provide a system which economically satisfies the time-energy sensitivity of its operation, the emphasis in the art is to provide the most efficient means to maintain the activity of a biomass by transferring as much oxygen into the bioreactor's reaction mass (aqueous suspension of biomass, namely, of organic solids and microorganisms) as can be used by microorganisms to biodegrade biochemically oxidizable material. To be commercially acceptable, this must be done within a reasonable period of time, using a small amount of energy, to produce treated water of acceptably high quality. The high difficulty of evaluating such a system with a laboratory bench scale apparatus, led to the testing of the system in a pilot plant on the grounds of the NDH Sandusky automobile plant of General Motors Corp. Wastewater from a Mansfield General Motors plant was also trucked over to the pilot plant for testing because there was a substantial variation in the composition of the wastewater from the two plants.

More specifically, this invention relates to treating a mixture of natural hydrocarbon and synthetic metal-working fluids, fats, oils and greases ("FOG") mixed with synthetic organic and organometallic compounds, some of which are insoluble solids, others emulsifiable liquids, and still others soluble solids and liquids. This mixture in wastewater is referred to herein as "waste fluids". Waste fluids comprise particularly difficult-to-treat components and relatively easy-to-treat components.

The problem is to provide a process which will biologically degrade waste fluids in a wastewater stream which varies from one hour to the next, economically. The stream varies both in mass flow per hour, and in the concentration of waste fluids therein. The problem to be solved is to use a membrane separator which typically operates with constant mass flow per hour, in conjunction with a bioreactor, to provide an effluent which will meet governmental compliance requirements. Further, the ratios of the components of the waste fluids varies during operation. Yet, a successful process requires that it operate essentially continuously substantially without human attention. Still further, the waste production from the process is to be minimized.

The foregoing problems are solved by a process which requires that free oil and, all solids except finely divided solids, be removed before the wastewater is treated further. It was discovered that the composition of solids in this system are such that those in the size range greater than about 106 $\mu$m (140 mesh U.S. Standard Sieves) adversely affect operation of the membranes. Free oil impairs the selectivity of the membranes by fouling them (wetting out), preventing the passage of water. Solids substantially larger than 106 $\mu$m were mainly recalcitrant solids, much of which were inorganic, e.g. metal and carbide particles; and among larger organic particles in the waste fluids, many were of a composition so poorly biodegradable that removing them in a pretreatment proved to be a determinative factor for operating our process successfully. Except for those very small solids which pass through the 140 mesh sieve, the only solids in our bioreactor system are the biomass of microorganisms both dead and alive, and the solids those microorganisms generate.

Another determinative factor was specifying the system so as to generate permeate at a rate greater than that at which solids-depleted feed is introduced to the reactor. This high rate of permeate production makes it possible to provide a permeate recycle, in addition to the recycle of biomass in concentrate. Despite the apparent contradiction of recycling the permeate after going to the trouble of generating it, the permeate recycle is essential for the reactor to operate at constant volume, and to feed a membranous ultrafiltration zone at a constant rate of flow. The reason for the permeate recycle is explained in detail herebelow.

The process incorporates the foregoing features and relies upon the unique operation, in combination, of an ambient pressure aerobic reactor, an equalization tank, and a membrane device tailored to let pass through it, a predetermined amount and size of molecules which are the product of biodegradation.

Wastewater delivered ("delivered wastewater") is pretreated to remove floatable free oil and settleable solids prior to transfer into an equalization tank. One example of a pretreatment device is a corrugated plate interceptor (CPI) although any other devices suitable for removing floatable oils and settleable solids may be used. Alternatively, the removal of floatable free oils and settleable solids may be performed in the equalization tank directly, with suitable equipment. The feed to the bioreactor is taken from the equalization tank and contains FOG having chemical and physical properties quite unlike wastewater containing waste generated by human activities, typical of municipal wastewater. In particular, wastewater from metal-working operations contain any or all of the following constituents: petroleum-based (oil-based) FOG; non-petroleum based (synthetic or semi-synthetic oils) FOG; and organometallic compounds. These constituents vary in biodegradability across the full spectrum of difficulty. It is this feed which was treated in a membrane bioreactor system which was extensively tested at the NDH General Motors automobile plant, in the pilot plant tests which were reported in a paper presented on Oct. 10, 1990 at the WPCF Conference in Washington, D.C.

The basic technology, using a bioreactor with a membrane separator, was disclosed a quarter of a century ago in U.S. Pat. No. 3,472,765 to disclosure of which is incorporated by reference thereto as if fully set forth herein. They used a well-aerated bioreactor in combination with a microfiltration or an ultrafiltration membrane, not only to avoid the time penalty of gravity settling technology but also to provide essentially solid-free water of high quality ("permeate") to be recovered and the remaining undegraded high molecular weight materials and solids-containing stream ("concentrate") recycled to the bioreactor.

The essential process characteristic of the '765 patent was that it maintained a constant reactor volume by varying the feed flow. Further, the organic solids were comminuted but not removed, so they remained in the recycled concentrate. In contrast, the process of our invention maintains a constant reactor volume by maintaining the flow rate of feed to the reactor essentially constant, and, recycling both concentrate and permeate. In our process, essentially no solids greater than about 106 μm enter the reactor, and the only solids in the system are the aforementioned finely divided organic solids, the biomass itself, and the products that biomass generates.

The '765 system was commercialized with limited success in the 70's mainly with respect to human and animal waste, such success arising in applications which were not cost-sensitive. The operation of such a system with delivered wastewater containing waste fluid with FOG from a metal-working plant was unsuccessful because the solids retention time (SRT) and the hydraulic retention time (HRT) were not long enough to degrade the waste fluid.

Though each mechanical component in the system is known, the combination used in our process is found to be effective if operated as described hereunder to treat delivered wastewater which contains a very high concentration of FOG. The bioreactor is operated to maintain a predetermined concentration of FOG and total suspended solids ("TSS"), and the membrane device is operated as an ultrafiltration membrane at low pressure, in the range from about 170 to 1035 kPa (25 psig to 150 psig). Such operation results in a controlled high mass flow of solids-containing concentrate as a recycle stream.

The mass flow from the bioreactor is surprisingly high, yet (i) provides a long solids retention time (SRT), and enough liquid as is required per unit of air entrained, to degrade the FOG in delivered wastewater, and also (ii) completes degradation of the organic waste with a hydraulic retention time of less than 5 days, preferably less than 48 hr, in the bioreaction system. The key to providing the foregoing is to retain emulsified pollutants for a period longer than the liquid residence time or hydraulic retention time (HRT) of the reactor, based on the wastewater flow rate.

SUMMARY OF THE INVENTION

It has been discovered that operation of a bioreactor system including an aerobic bioreactor in combination with a membrane filtration device will successfully degrade delivered wastewater containing high concentrations of natural, synthetic and semi-synthetic metal-working fluids, fats, oils and greases (together "FOG" for brevity) used in a metal-working plant, only if the system is operated within a narrowly defined window of operating criteria. The wastewater is first skimmed and settlable solids removed. In particular, because the waste fluid contains poorly degradable solids and a high concentration of "FOG", all except very finely divided solids, are removed, preferably in a filtration zone equipped with a 106 μm screen. This pretreated wastewater allows the bioreactor in combination with an ultrafiltration membrane means, to be operated with a hydraulic retention time (HRT) of at least 24 hr, preferably from 1 to 5 days, and a solids retention time (SRT) in the range from about 30–150 days, preferably from 50–125 days.

It is therefore a general object of this invention to provide a process for biodegrading the unique components of waste fluids in a bioreaction zone so long as the bioreaction zone (a) is operated within narrowly defined limits, particularly with respect to removal of solids entering the bioreaction zone, maintaining the flow of feed to the bioreaction zone and membranous ultrafiltration zone substantially constant, and utilizing a permeate recycle to maintain a substantially constant operating liquid throughput; and, (b) the membranous filtration zone uses a membrane tailored to let pass molecules smaller than 0.001 microns (μm) in effective diameter when operated at a pressure from about 170–689 kPa gauge (25–100 psig).

It has also been discovered that waste fluids generated in a metal-working facility can be successfully biodegraded if solids are first removed from delivered wastewater, the mass flow of feed to the bioreaction zone is maintained substantially constant, the hydraulic retention time (HRT) is maintained in the range from about 24–48 hr, and the solids retention time (SRT) is maintained greater than 30 days, preferably at least 50 days. Effectively, the emulsified pollutants are retained for a period longer than the HRT of the bioreaction zone, based on the flow rate of wastewater.

It is another general object of this invention to provide a process comprising, (a) removing solids from a mixture of synthetic metal-working fluids and fats, oils and greases used in a metal-working facility, and feeding a substantially constant flow rate of feed $Q_f$ to the reactor; (b) aerating the mixture in the presence of live microorganisms in a bioreaction zone at ambient pressure while maintaining a substantially constant HRT in the range from about 24 hr but less than 48 hr in that zone; (c) flowing a predetermined portion of the contents of the bioreactor to a membranous filtration zone so as to generate a rate of flow of permeate greater than that of the feed wastewater to the bioreaction zone; (d) maintaining the solids concentration of the predetermined portion within predetermined limits; (e) recycling a first portion $Q_{p1}$ of the permeate to the bioreactor; and (f) removing a second portion $Q_{p2}$ of permeate as high quality water.

It is a specific object of this invention to provide an essentially continuous process for treating wastewater utilizing a membrane-bioreactor system, the process comprising, (a) providing a pretreatment zone for said wastewater, said zone having a volume sufficiently large to equalize variations in the flow rate of said wastewater to said pretreatment zone which is adapted for removal of settlable solids and skimmable free oil, and removing skimmed wastewater from said zone;

(b) removing solids greater than about 106 μm from said skimmed wastewater to provide a solids-depleted wastewater feed;

(c) feeding said solids-depleted wastewater feed at an essentially constant rate of flow to a bioreaction zone maintained with an essentially constant volume of liquid therein, and, with a hydraulic retention time of at least 24 hr;

(d) aerating said biochemically oxidizable material in the presence of live microorganisms adapted to degrade said materials which are held in suspension within said reactor with a solids retention time (SRT) of at least 30 days;

(e) flowing said suspension through a membranous filtration zone at a velocity and pressure sufficient to maintain a predetermined membrane flux in said filtration zone at which flux essentially no solids are retained on the surface of membrane in said filtration zone, said membranous zone having a membrane area sufficiently large to provide a flow rate of permeate greater than said essentially constant rate of flow of said solids-depleted wastewater feed;

(f) separating permeate from a concentrate containing said solids;

(g) flowing said concentrate from said membranous filtration zone into said bioreaction zone as a concentrate recycle;

(h) removing an effluent of acceptable quality; and, (i) flowing excess permeate over that removed as effluent, back to said bioreactor.

It is another specific object of this invention to treat a poorly degradable wastewater stream in a system comprising a bioreactor and a module containing an ultrafiltration membrane, and yield an effluent having the following values:
Chemical Oxygen Demand, COD<450 mg/L;
Biological Oxygen Demand, $BOD_5$<25 mg/L;
Total suspended solids, TSS<10 mg/L;
Total FOG<25 mg/L; and $NH_3$—N<1.0 mg/L.

BRIEF DESCRIPTION OF THE DRAWING

The foregoing and additional objects and advantages of the invention will best be understood by reference to the following detailed description, accompanied with a schematic illustration of a preferred embodiment of the invention, in which.

DETAILED DESCRIPTION OF PREFERRED EMBODIMENTS

Figure 1:
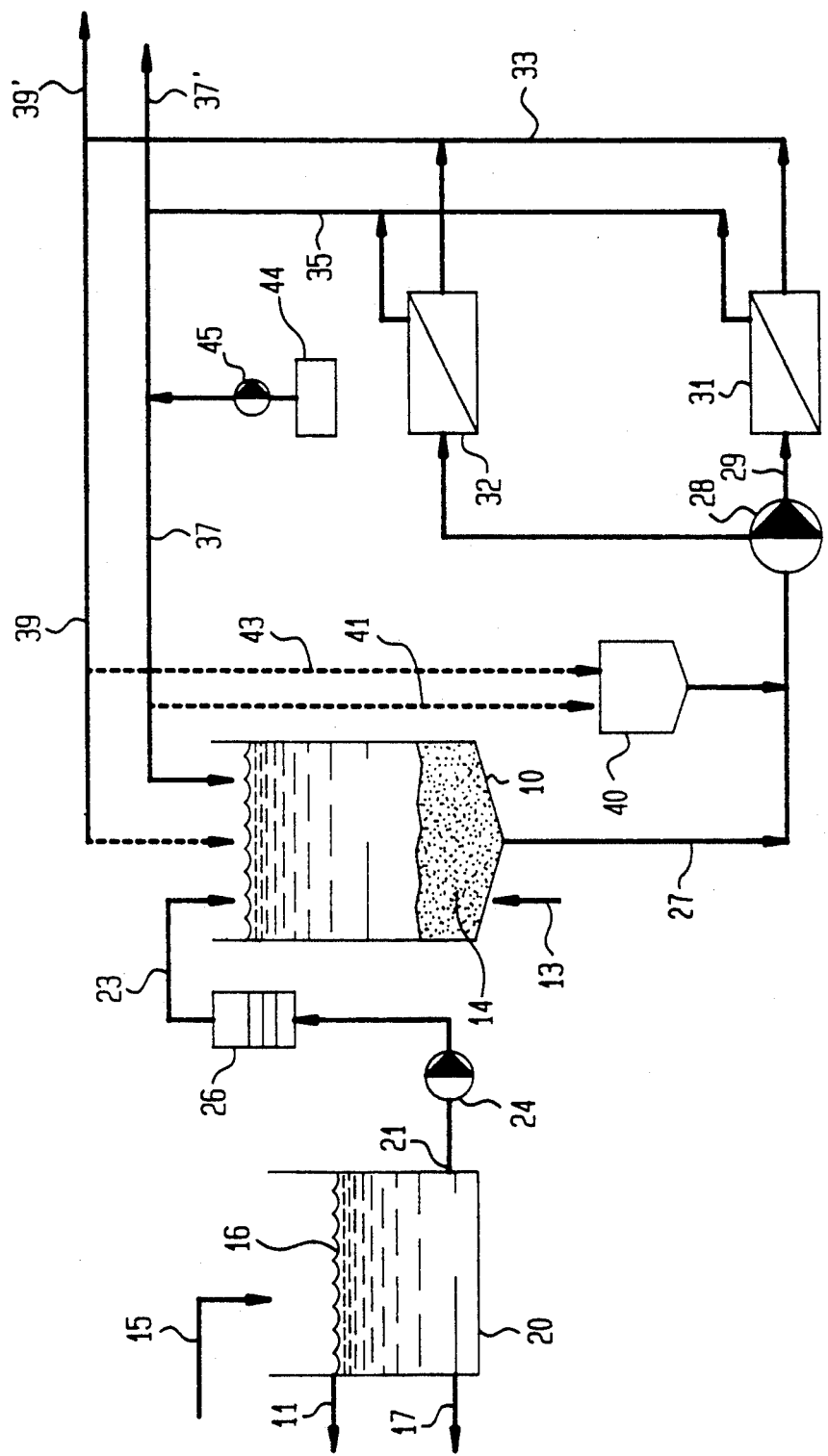
FIG. 1 is a simplified flowsheet of a membrane-bioreactor system schematically showing its operation with two ultrafiltration modules, and the essential permeate recycle.

In a preferred embodiment the membrane-bioreactor system is intended for use by those concerned with the cost of treating wastewater generated in a metal-working plant effectively. Though this wastewater is a relatively small volume compared to the volume of biodegradable waste generated by a metropolitan area, the difficulty of disposing of it requires that it be disposed of by the operators of the plant. The delivered wastewater from such a plant cannot be treated in a municipal sewage disposal facility because of the poor biodegradability of waste fluids in the wastewater.

It will be recognized that, typically, it is of little concern whether a reactor operates at essentially constant volume with essentially constant feed, or a variable feed. By "essentially constant" we mean ±10%. However, to keep reactor volume constant with varying flow rate of feed, the membrane area has to be based on minimum flux observed during a cycle. Thus, to treat 1000 L/hr ("Q") of feed with membranes having a minimum flux rate of 100 L/m²-hr ("F"), the membrane area ("A") required is 10 m². However, the reactor volume ("V") has to be based on maximum flux, since the reactor must contain enough wastewater to be flowed to the membranes when they are operating at maximum flux. Assuming the maximum flux is twice the minimum, that is, 200 L/m²-hr, and the minimum HRT required to degrade the waste is 24 hr, then V=F×A×HRT=48000 L.

With constant feed flow rate in a reactor operating at constant volume, as in our system, the required membrane area is based on minimum flux, as before, and is 10 m². But the reactor volume is based on minimum flux 100 L/m²-hr, since feed flow is constant and both concentrate and permeate are recycled, so the volume of the reactor now required is V=F×A×HRT=100 L/m²-hr×10 m²×24 hr=24,000 L.

In a commercial system which requires that a feed flow rate of 1000 L/hr be treated, it makes a significant economic difference whether the reactor is to be twice the volume it could be.

As stated hereabove, it was found that once free oil and the incoming solids were removed from the delivered wastewater, successful biodegradation of the feed to the bioreactor depended upon maintaining a high enough SRT and HRT, and at the same time being able to accommodate normal flux fluctuation during a cycle before cleaning of the membrane, without substantially sacrificing the average flux obtained during the cycle.

In a typical situation, faced with having to do the foregoing, one can either (a) raise the pressure of the stream delivered to the membranes of the number of modules required to provide a desired permeate flow which, at equilibrium operating conditions, is equal to the flow $Q_f$ of feed; or, (b) one can provide a larger number of modules than needed so that one can operate the modules under substantially constant pressure of the incoming stream because the flux of the membranes remains substantially constant.

Though not immediately evident, one finds that increasing the pressure to maintain the flux across the membranes of a module, soon results in the use of a pressure which is so high as to entail an unacceptably high risk of failure of a membrane.

The other alternative, namely using much more membrane area than required in the preceding embodiment, results in production of a large amount of permeate which is greater in mass flow per unit time, than $Q_f$. Since this would result in depletion of the liquid content of the reactor, a portion $Q_{p1}$ of the permeate produced in the modules, preferably a minor thereof, is recycled, the remainder $Q_{p2}$ being withdrawn.

Under steady state conditions, the relationship between microbial growth and substrate removal may be expressed as:

$$\mu = Yk - b \tag{1}$$

where, $\mu$ = organism specific growth rate, mass/mass-time,
Y = organism yield coefficient, mass/mass,
K = specific substrate utilization rate, mass/mass-time and, b = organism decay coefficient, $time^{-1}$.
In a biological reactor, the organism specific growth equal to the reciprocal of the SRT of the system. Therefore, from equation (1):

$$\mu = 1/SRT = Yk - b = Y_n k \tag{2}$$

where, $$SRT = \frac{\text{volatile suspended solids (VSS) in the reactor}}{\text{VSS lost in the effluent or intentionally wasted/day}}$$

and, Yn=net organism yield coefficient. Since the VSS lost in the effluent is negligible and solids are wasted directly from the reactor, the system SRT can be expressed as $$SRT = V/W \tag{3}$$

where,

V = reactor volume, m$^3$ and, W = reactor volume wastage rate, m$^3$/hr.

The SRT is controlled by wasting a predetermined volume of the contents of the reactor, per day.

After establishing the SRT deemed necessary to achieve a given effluent quality, along with values for Y and b, or Yn, k can be determined. With k known, the required reactor volume can be determined from values for the reactor VSS and feed and effluent concentration values. The SRT and HRT of an optimal reactor depends on the molecular size of the wastewater components and reaction products, the biological and chemical (hydrolysis reactions) treatability characteristics of the wastewater components, the inhibitory nature of the reaction products, and the membrane characteristics with respect to effective pore size.

Once a minimum membrane flux is specified, the corresponding minimum membrane area (A) can be calculated as:

$$A = Q/J$$

where,

A = total membrane area required, m$^2$ and, J = membrane flux, m$^3$/m$^2$-day.

J depends on such factors as the reactor TSS, surface velocity, temperature, transmembrane pressure drop, surface fouling and the extent of concentration polarization. Concentration polarization arises from the accumulation of solutes on the membrane surface. Solutes reach the membrane surface by convective transport of the solvent, a portion of which passes through the membrane. The rejected solutes often form a viscous gel layer on the membrane. This gel layer acts as a secondary membrane reducing the flux and often reducing the passage of low molecular weight solutes. Surface fouling is the result of the deposition of submicron particles on the surface as well as the accumulation of smaller solutes due to such processes as crystallization and precipitation. It is this deterioration in membrane flux which is counteracted by using a larger membrane area than is necessary, and by recycling permeate to the bioreactor.

Referring to FIG. 1 there is shown a bioreactor 10 which contains an aqueous suspension 12 of live microorganisms which have been especially acclimated to ingest the waste fluids as nutrients, albeit with the deliberate addition of other "added" nutrients such as phosphate and nitrogenous compounds. The nutrient value of the waste fluids is typically so poor as to require continuous addition of the added nutrients to help the microorganisms ingest the waste fluids. Such microorganisms are commercially available. The bioreactor operates at atmospheric pressure; it is provided with a sparger 14 through which air or oxygen required to maintain the microorganisms, is distributed from conduit 13 uniformly throughout the reactor. The reactor includes baffle means to improve contacting the waste fluids with the microorganisms.

Delivered wastewater is introduced through line 15 into an equalization tank 20 which, in addition to equalizing the flow to the reactor, also serves as a settling tank for the removal of settled solids through line 17, and the removal of free oil through line 11. Free oil and grease "skim" 16 float to the surface and are skimmed off. Solids 17 settle and are either periodically or continuously removed from the bottom of the settling tank, depending upon the level of solids in the delivered wastewater, and disposed of. The aqueous suspension of wastewater from the settling tank 20 is withdrawn through line 21 and 22 before it is led to the suction side of a feed pump 24 which operates at low pressure to pump the aqueous suspension of equalized wastewater through about a 106 μm filtration unit 26. The filtered aqueous suspension is then led through conduit 23 into the bioreactor 10.

Feed to the bioreactor 10 is maintained essentially constant so as to maintain a predetermined concentration of solids in the mass 12, and liquid level in the bioreactor.

A stream of the contents 12 of the bioreactor is withdrawn through pump suction line 27 and discharged as a pressurized stream by pressurization pump 28 through a discharge line 29 to a membrane filtration unit indicated generally by reference numeral 30.

It is preferred, in a commercial unit, to use a membrane filtration unit 30 having two or more ultrafiltration modules 31 and 32 connected in parallel, in each of which the membrane has a pore size smaller than 0.5 μm, and to maintain operation of the membrane unit 30 with a clean water flux (measured at 20° C. and 40 psig or 370 kPa abs) of at least 10 m$^3$/m$^2$/day.

Permeate from the membrane unit 30 is removed from the system through permeate recycle conduit 33, while concentrate leaves through concentrate recycle conduit 35. The outlet pressure of the concentrate in line 29 is in the range from about 250 kPa (25 psig) to about 1000 kPa (125 psig) depending upon the configuration of the modules and layout of the membrane units.

A major portion, preferably more than 95% by volume, of the concentrate stream flowing through conduit 35 is recycled as recycle stream 37 and the remainder 37' purged through purge line 37. A minor portion, preferably from about 0.1% to 30% by volume, of the permeate stream flowing through conduit 33 is recycled as recycle stream 39 and the remainder withdrawn as treated effluent through effluent line 39'.

The volume of effluent permeate removed through line 39' will depend upon the physical characteristics of the reaction mass as well as the specifications of the membrane. Typically the effluent stream 33 will range from about 0.5% by volume or even less, to about 3% by volume of the pressurized bioreactor contents stream 29. The portion 39 of the permeate recycled to the bioreactor maintains a balance between incoming feed to the membrane device and removed effluent.

If desired, a portion of the recycle streams 37 and 39 may be diverted to a cleaning tank 40 through conduits 41 and 43 respectively, and used to wash and chemically clean the membranes when required. One or more chemicals addition tanks 44 are provided to supply acid and alkali for pH control, and various nutrients, for example phosphate, to supplement the nutrients provided to the biomass by the waste fluids. Pump(s) 45 meter the appropriate chemical(s) when desired.

A membranous filtration unit preferably has a pore size in the range from about 0.001 μm to about 0.05 μm, but may be larger, from about 0.01 μm to about 0.1 μm, if lesser quality effluent is acceptable.

Preferred membranes for microfiltration are derived from poly(vinyl alcohol), polysulfone, polypropylene, nylon and the like, for example Zenon SJ. The same materials may be used to provide ultrafiltration membranes, for example a Zenon TAM membrane.

Figure 2:
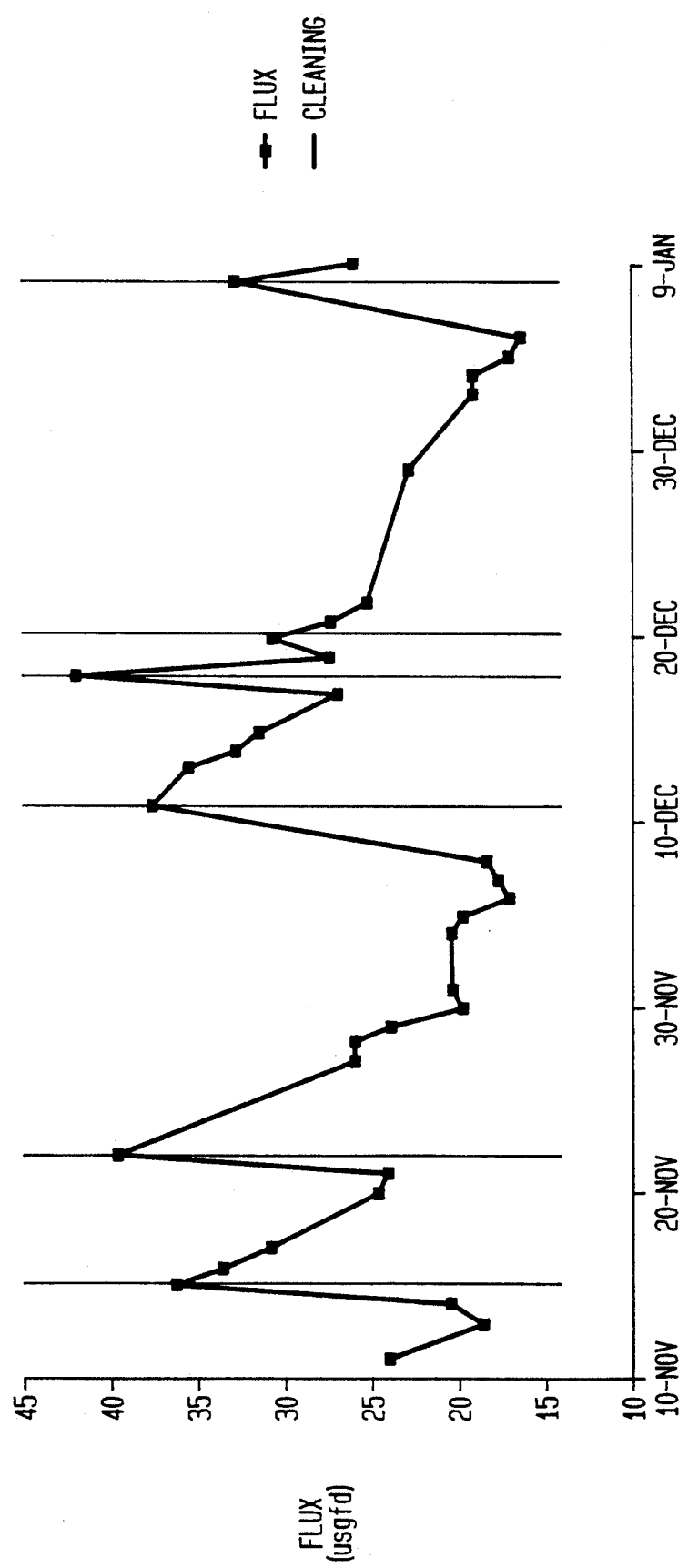
FIG. 2 is a graph showing the variation of membrane flux as a function of time.

Referring to FIG. 2 it is evident that the modules operated for over a year without having to be replaced.

For the specific membrane modules tested, the flux varied over more than a two-fold range from about 16 gals/ft²-day to 42 gals/ft²-day. It is this large variation in flux which is accommodated by the permeate recycle, allowing the reactor to operate at essentially constant volume, with an essentially constant rate of feed, and having an essentially constant rate of suspended solids withdrawn from the reactor and flowed to the membrane modules. The desired output of high quality effluent could thus be maintained.

Figure 3:
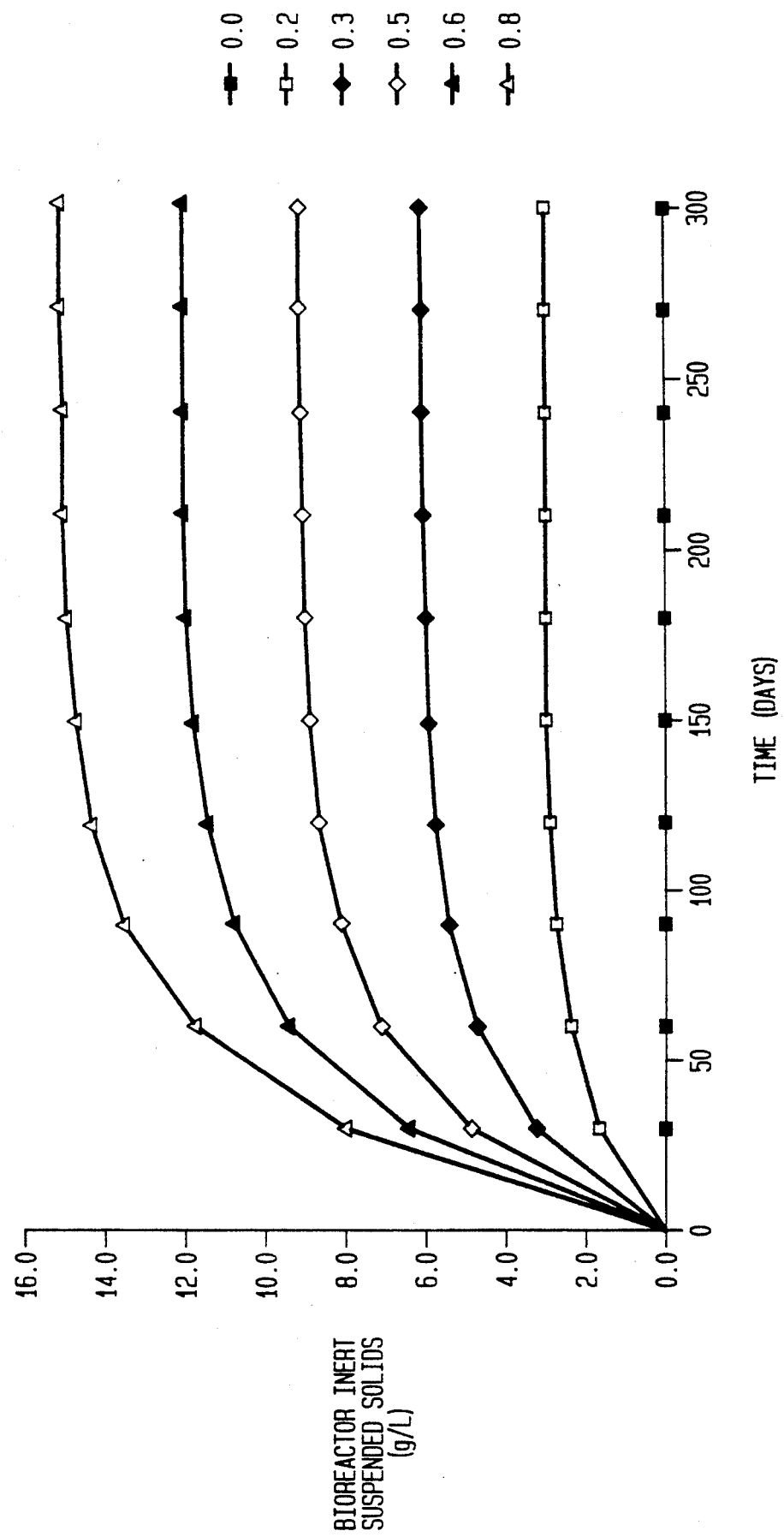
FIG. 3 is a graph showing the build-up of suspended solids in the bioreactor due to inert solids over nearly a year, at various levels of inert solids concentration in the wastewater feed (g/L).

The sensitivity of the reactor to the presence of inert solids such as non-degradable silicon carbide and metal particles at various concentrations of solids present, over a period of nearly a year, is graphically demonstrated in FIG. 3. The reactor operated at HRT=2 days, and a SRT=40 days. It will be evident that the steep rise of the build-up with increasing concentration of solids will adversely affect the effectiveness of the membrane modules, not only in terms of their flux, but because such inorganic solids have an abrasive action at the velocities required. Such abrasive action can easily damage a membrane requiring that the damaged module be correctly identified and replaced.

The bacteria found to be effective in the process are commonly found in activated sludge and include the genera Pseudomonas, Zooglea, Achromobacter, Flavobacter, Nocardia, Bdellovibrio, and Mycobacter, normally all considered heterotrophic. These perform the bulk of the bio-stabilization. The autotrophic bacteria which may be present are represented by Nitrosonomas and Nitrobacter, both nitrogen fixing. Also found in activated sludge are a variety of fungus, yeasts and protozoa, some of which are also useful in our process.

In a pilot plant operation, a 3.78 m³ (1000 gal) bioreactor is operatively connected with a variable module, multi-tube membrane unit of Zenon Z8 modules with HSC or TAM membranes. Each module contained S 1.83 m long by 2.22 cm diameter tubes connected in series to provide a membrane area of 0.975 m²/module. The modules themselves were connected in parallel with the concentrate recycle to the bioreactor, and with the permeate being recycled to the bioreactor and being removed as effluent. A liquid level control system maintains the reactor volume within 11 percent of the mean reactor volume. Enough air was introduced into the reactor to provide complete mixing and aerobic conditions for growth of the biomass.

The daily mean dissolved oxygen (DO) concentration in the reactor was in the range from 0.5 to 6.1 mg/L. The reactor pH ranged from 6.8 to 7.9. The ratio of concentrate recycle $Q_c$ to permeate flow $Q_p$ is maintained at about 120. The concentration of solids in the concentrate recycle line is essentially the same as that in the bioreactor.

Membrane-Bioreactor System Start-up

The reactor is seeded with biomass together with a small amount of nutrients (nitrogen, phosphorus, potassium) if required, to support biomass growth, and air flow was adjusted to maintain an excess concentration of dissolved oxygen. The reactor pH was maintained near neutral by addition of sulfuric acid. Automatic pH control is maintained with a set point of 7.5.

In several pilot plant runs made with representative wastewater feed taken from two metal-working facilities, the bioreactor was operated with target pilot plant SRT (days) in the range from 50 to 100, and with HRT (days) in the range from 1.87 and 3.74. The performance of the system was assessed by sampling several locations and analyzing for particulate and soluble components. Analyses for $NH_3$—N, total Kjeldahl nitrogen (TKN), and total phosphorus (TP) were less frequent than the analyses for other analytical parameters.

Operating conditions for runs are presented in Table I below. The performance results are summarized in Table II below. In Table II, experiments P2-1, P2-2 and P2-3 indicate that even longer SRT and HRT conditions than for other runs, provide a further improved effluent quality. Note that the accumulation of non-reactive compounds in the reactor do not appear to result in microbial inhibition at least to the extent that the degree of nitrification or ammonia reduction across the membrane is affected. This is evidenced by the generally low values of $NH_3$—N in the effluent.

In Table III below are listed soluble reactor values (passing 0.45 µ filter paper) vs. effluent COD values. The extent of accumulation of non-reactive compounds is lower for a SRT of 100 days than for 50 SRT days.

TABLE I

MBR system pilot plant operating results to-date under equilibrium conditions[a].

| Experiment (Days Since Start-up) | Feed Rate (Range)[b], gal/min | Reactor Operating Conditions | | | |
|---|---|---|---|---|---|
| | | HRT, days | SRT,[c] days | VSS, mg/l | Temperature (Range)[b], °C |
| P2-1 (day 45 to day 63) | 0.35 (0.31–0.37) | 1.87 | 100 | 7488 | 29 (27–33) |
| P2-2 (day 88 to day 105) | 0.13 (0.13–0.17) | 3.74 | 100 | 3730 | 31 (28–34) |
| P2-3 (day 137 to day 160) | 0.13 (0.12–0.15) | 3.74 | 50 | 4034 | 31 (28–34) |
| P3-1 (day 193 to day 218) | 0.26 (0.25–0.30) | 1.87 | 50 | 6495 | 32 (28–37) |
| P3-2 (day 242 to day 253) | 0.26 (0.23–0.28) | 1.87 | 100 | 12415 | 32 (30–34) |

[a]All values stated are means during operating period unless otherwise indicated.
[b]Range of mean daily values.
[c]SRT controlled at stated value by wasting solids equivalent in concentration to that in the reactor.

TABLE II

MBR system pilot plant performance results during operation under equilibrium conditions[a].

| Analytical Parameters | Experiment | | | | |
|---|---|---|---|---|---|
| | P2-1 | P2-2 | P2-3 | P3-1 | P3-2 |
| Feed Values, mg/l | | | | | |
| COD | 4496 | 6052 | 4345 | 6864 | 5937 |
| $BOD_5$[b] | 1010 | 1360 | 919 | 1206 | 1043 |
| TSS | 253 | 817 | 346 | 889 | 410 |
| Total FOG | 457 | 657 | 714 | 907 | 788 |
| Hydrocarbon based FOG | 278 | 352 | 244 | 307 | 403 |
| TKN | 68 | 49 | 79 | 43 | 59 |
| Effluent Values, mg/l | | | | | |
| COD | 302 | 238 | 183 | 664 | 417 |
| $BOD_5$ | 4 | 3 | 3 | 34 | 21 |
| TSS | 10 | 6 | 11 | 6 | 1 |
| Total FOG | 17 | 11 | 9 | 36 | 16 |
| Hydrocarbon based FOG | 5 | 4 | 3 | 5 | 5 |
| $NH_3N$ | 0.4 | 1.3 | 0.2 | 4.2 | 0.8 |
| TKN | 0.7 | 2.1 | 5.2 | 7.7 | 4.7 |

[a]All values stated are means during operating period. TSS represents total suspended solids and FOG represents fats, oils and grease.
[b]Calculated from COD to $BOD_5$ correlation based on analysis of all paired analytical data available during treatment of each wastewater.

TABLE III

Comparison of soluble reactor versus effluent COD values[a].

| Experimental Conditions | Soluble Reactor COD, mg/l | Effluent COD, mg/l |
|---|---|---|
| NDH Wastewater | | |
| SRT 100 days HRT 3.74 days (run P2-2) | 4592 | 211 |
| SRT 50 days HRT 3.74 days (run P2-3) | 6152 | 196 |
| CPC Mansfield Wastewater | | |
| SRT 50 days HRT 1.87 days (run P3-1) | 3818 | 587 |
| SRT 100 days HRT 1.87 days (run P3-2) | 2084 | 425 |
| SRT 50 to 100 days HRT 1.87 days (TAM membrane) | 815 | 411 |

[a]All values stated are means of paired grab samples taken. Samples were not taken during run P2-1. Soluble reactor values based on analysis of sample after filtration through 0.45 micron filter.

The extent of degradation of slowly degradable high mol wt soluble compounds in the feed exceeds the build-up of high mol wt chemical or biological products as the SRT is further increased from 50 days to 100 days.

A further reduction in accumulation of high mol wt, soluble and non-reactive compounds can be achieved by using a more open membrane such as the Zenon TAM membrane, than the Zenon HSC membrane used for the other runs.

A side-by-side comparison of the results obtained with the HSC and TAM membranes is presented in Table IV below. In run P3-2 a COD value equivalent to 7% of the feed concentration appeared in the effluent representing microbial metabolites or highly recalcitrant feed material. During the TAM membrane run, this value increased to about 11%. Therefore, as might be expected, a higher effluent COD is obtained with a more open membrane than a less open one, using wastewaters containing equal levels of organic/inorganic constituents.

Solids balances were completed across the membrane system at each equilibrium condition in order to determine biomass net yield coefficients. The low yield values observed are attributable to the long SRTs used in this process. These values are set forth in Table V below. The mass balance information can be used to estimate the solids produced per volume of wastewater treated in the system. A value of 0.21 kg/m$^3$ (1.78 lb/1000 gal) of wastewater treated was determined, based on the average net yield value observed. This value is less than 10% of the solids that would be produced from a conventional physical-chemical oily wastewater treatment system with conventional add-on biological treatment.

TABLE IV

Effect on MBR system performance of using a more open membrane in ultrafiltration unit.

| | CPC Mansfield Wastewater | |
|---|---|---|
| Parameter | HSC membrane (RUN P3-2) | TAM membrane (day 271 to day 287) |
| Equilibrium Reactor Operating Conditions | | |
| HRT, days | 1.87 | 1.87 |
| SRT, days | 100 | 100[a] |
| System Performance Results | | |
| Feed Values, mg/l | | |
| COD | 5937 | 3415 |
| BOD$_5$ | 1043 | 600 |
| TSS | 410 | 331 |
| Total FOG | 788 | 386 |
| Hydrocarbon based FOG | 403 | 225 |
| TKN | 43 | 27 |
| Effluent Values, mg/l | | |
| COD | 417 | 386 |
| BOD$_5$ | 21 | 20 |
| TSS | 1 | 2 |
| Total FOG | 16 | 15 |
| Hydrocarbon based FOG | 5 | 5 |
| NH$_4$—N | 0.8 | 0.4 |

[a]Actual SRT in reactor during operation with TAM membranes is estimated between 50 and 100 days. Calculating actual value complicated by unplanned solids wasting.

TABLE V

Solids yield/sludge production during operation under equilibrium conditions.

| | Biomass Net Yield Coefficients | |
|---|---|---|
| Experimental Conditions | kg VSS / kg COD removed | kg VSS / kg BOD$_5$ removed |
| NDH Wastewater | | |
| SRT 100 days HRT 1.87 days (run P2-1) | 0.033 | 0.143 |
| SRT 100 days HRT 3.74 days (run P2-2) | 0.024 | 0.103 |
| SRT 50 days HRT 3.74 days (run P2-3) | 0.072 | 0.329 |
| CPC Mansfield Wastewater | | |
| SRT 50 days HRT 1.87 days (run P3-1) | 0.039 | 0.207 |
| SRT 100 days HRT 1.87 days (run P3-2) | 0.042 | 0.227 |

Ultrafiltration Unit Design and Performance

The membrane flux of the unit was approximately 100 L/m$^2$-hr (59 gal/ft$^2$-day) upon start-up of the system. The flux declined rapidly over approximately the first forty days and after that, averaged between 40–50 L/m$^2$-hr. The membranes were cleaned with alkali every one or two weeks to restore the flux to approximately 60 L/m$^2$-hr.

The membrane unit was operated until day 196 with minimal back pressure exerted on the membranes by the discharge pressure control valve. The pressure at the exit of the membrane unit was less than 70 kPa (10 psig). On day 196, the pressure was increased to 140 kPa (20 psig) to bring the system in line with anticipated full scale operating conditions. As a result of the increase of pressure there was also a 14–20% increase in flux.

Operation of the pilot plant led to the conclusion that the system described and operated as specified, is able to treat the specified wastewater with the specific waste fluids typically present in such a stream from a metal-working facility such as an automotive plant from which the wastewater samples treated were obtained, and provide effluent with the following specification:
Chemical Oxygen Demand, COD<450 mg/L;
Biological Oxygen Demand, $BOD_5$<25 mg/L;
Total suspended solids, TSS<10 mg/L;
Total FOG<25 mg/L; and $NH_3$—N<1.0 mg/L.

It will now be evident that the long SRTs and HRTs for this process are quite unlike those used in a conventional bioreactor for typical organic waste, such as used in the '765 bioreactor. Typical SRTs for a '765 system range from to 5 days and the HRTs range from about 0.5 hr to 3 hr. The very long times used in our process are surprisingly accomodated by the specific features of the process which target wastewater containing waste fluids which are difficult to biodegrade. Nevertheless, they are usable as nutrients for the biomass we use provided of course, the process is operated as specified.

Having thus provided a general discussion, described the overall process in detail and illustrated the invention with specific examples of the best mode of carrying out the process, it will be evident that the invention has provided an effective solution to a difficult problem. It is therefore to be understood that no undue restrictions are to be imposed by reason of the specific embodiments illustrated and discussed, except as provided by the following claims.

We claim:

1. A process for continuously biodegrading biochemically oxidizable material comprising a solids-containing mixture of easy- and difficult-to-degrade waste fluids in a wastewater stream from a metal-working plant, said process comprising,
   (a) providing a pretreatment zone for said wastewater, said zone having a volume sufficiently large to equalize variations in the flow rate of said wastewater to said pretreatment zone which is adapted for removal of settlable solids and skimmable free oil, and removing skimmed wastewater from said zone;
   (b) removing finely divided solids injurious to membranes, from said skimmed wastewater to provide a solids-depleted wastewater feed;
   (c) feeding said solids-depleted wastewater feed at an essentially constant rate of flow to a bioreaction zone maintained with an essentially constant volume of liquid therein, and, with a hydraulic retention time of at least 24 hr;
   (d) aerating said biochemically oxidizable material in the presence of live microorganisms adapted to degrade said materials which are held in suspension within said reactor with a solids retention time (SRT) of at least 30 days;
   (e) flowing said suspension through a membranous filtration zone at a velocity and pressure sufficient to maintain a predetermined membrane flux in said filtration zone at which flux essentially no solids are retained on the surface of membrane in said filtration zone, said membranous zone having a membrane area sufficiently large to provide a flow rate of permeate greater than said essentially constant rate of flow of said solids-depleted wastewater feed;
   (f) separating permeate from a concentrate containing said solids;
   (g) flowing said concentrate from said membranous filtration zone into said bioreaction zone as a concentrate recycle;
   (h) removing an effluent of acceptable quality;
   (i) flowing excess permeate over that removed as effluent, back to said bioreaction zone; and,
   (j) periodically removing a minor proportion by volume of said concentrate recycle to modulate the solids content in said bioreaction zone.

2. The process of claim 1 wherein the flow of said excess permeate to said bioreaction zone is a minor proportion by volume of said permeate removed as effluent.

3. The process of claim 1 wherein said finely divided solids are smaller than about 106 μm in diameter.

4. The process of claim 2 wherein said waste fluids comprise organometallic compounds, natural, petroleum-based, synthetic and semi-synthetic fats, oils and greases used in machining operations in said metal-working plant.

5. The process of claim 4 wherein said effluent has at least the following specifications:
Chemical Oxygen Demand, COD<450 mg/L;
Biological Oxygen Demand, $BOD_5$<25 mg/L;
Total suspended solids, TSS<10 mg/L;
Total FOG<25 mg/L; and $NH_3$—N<1.0 mg/L;
wherein FOG represents fats, oils and greases.

6. The process of claim 5 wherein said membranous filtration zone is operated at a pressure in the range from 170 kPa to 1035 kPa gauge, insufficient to affect membranes in said zone deleteriously.

7. The process of claim 6 wherein said HRT is in the range from 1-5 days, said SRT is in the range from 50-125 days, and said membranous filtration zone has a membrane area of at least 10 $m^2$.

8. A continuous process for treating wastewater containing waste fluids from a metal-working plant in a bioreaction zone containing a suspension of biomass including live microorganisms adapted to biodegrade components of said waste fluids, comprising,
   (a) removing free oil and finely divided solids injurious to membrane means from delivered wastewater to provide a solids-depleted feed substantially free of free oil;
   (b) maintaining the rate of flow of solids-depleted feed to said bioreaction zone essentially constant, said bioreaction zone containing bacterial cells greater than 0.5 μm diameter;
   (c) pumping an aqueous suspension from said bioreaction zone to a membranous filtration zone from which permeate is recovered at a rate greater than the rate of solids-depleted feed;
   (d) flowing said suspension through said membranous filtration zone at a velocity and pressure sufficient to maintain a predetermined membrane flux in the membranous filtration zone, at which flux essentially no solids are retained on the surface of membrane in the filtration zone;
   (e) separating permeate from a solids-containing concentrate, said permeate being essentially free of molecules having an effective diameter greater than 0.5 μm;
   (f) flowing said solids-containing concentrate as a concentrate recycle from said membranous filtration zone into the bioreaction zone;
   (g) returning to said bioreaction zone from 0.1 but less than 0.5 part by volume of permeate generated;
   (h) recovering the remainder of the permeate not returned to said bioreaction zone as treated effluent; and, (i) periodically withdrawing a minor proportion by volume of said concentrate recycle to remove recalcitrant and biological solids in concentrated form.

9. The process of claim 8 including maintaining said bioreaction zone with a solids retention time (SRT) in the range from 30 to 150 days, and a hydraulic retention time (HRT) in the range from 1 to 5 days.

10. The process of claim 9 wherein said finely divided solids are greater than about 106 μm in size.

11. The process of claim 10 wherein said waste fluids comprise synthetic fluids, fats, oils and greases used in machining operations in said metal-working plant; said minor portion of permeate recycled is in the range from 0.1% to 30% by volume of the permeate withdrawn; and said permeate withdrawn as effluent is in the range from 0.5% to 3% by volume of said suspension of biomass withdrawn from said bioreaction zone.

12. The process of claim 11 comprising removing said effluent having at least the following specifications:
Chemical Oxygen Demand, COD<450 mg/L;
Biological Oxygen Demand, $BOD_5$<25 mg/L;
Total suspended solids, TSS<10 mg/L;
Total FOG<25 mg/L; and $NH_3$—N<1.0 mg/L;
wherein FOG represents fats, oils and greases.

13. The process of claim 12 wherein said membranous filtration zone is operated at a pressure in the range from 170 kPa to 1035 kPa gauge, insufficient to affect membranes in said zone deleteriously.

14. The process of claim 13 wherein said HRT is in the range from 1-5 days, said SRT is in the range from 50-125 days, and said membranous filtration zone has a membrane area of at least 10 $m^2$.

15. A wastewater treatment system operatively connected between a source of wastewater containing waste fluids from a metal-working plant and an outlet for treated effluent, comprising,
(a) a vessel large enough to hold said wastewater delivered at a variable rate of flow and to equalize the rates of flow to a predetermined essentially constant rate removed from said vessel;
(b) means to remove free oil from said wastewater to provide a skimmed wastewater;
(c) filtration means having a mesh size small enough to remove finely divided solids injurious to membrane means and provide a solids-depleted feed;
(d) a bioreactor means in which is confined an essentially constant volume of a reaction mass with means for aerating skimmed and solids-depleted feed, and for contacting said feed with waste-degrading microorganisms mixed therein;
(e) pump means for withdrawing a suspension of biomass from said bioreactor at an essentially constant rate of flow, and impelling said suspension at elevated pressure;
(f) membrane filtration means in direct, open flow-receiving communication with said pump means, said membrane filtration means including plural membrane elements adapted to separate said suspended solids in a concentrate stream, from water permeate which is essentially free of solids, and means to duct said permeate away from said system;
(g) means to return said concentrate bioreactor means; and,
(h) means to return a minor portion of said permeate to said bioreactor means.

* * * * *